US005485632A

United States Patent [19]

Ng et al.

[11] Patent Number: 5,485,632

[45] Date of Patent: Jan. 16, 1996

[54] METHOD FOR INITIATING AND DETERMINING SIMULCAST TRANSMISSION OF A MESSAGE

[75] Inventors: Richard Ng, Palatine; Mark L. Shaughnessy, Algonquin; Gary W. Grube, Palatine, all of Ill.

[73] Assignee: Motorola, Inc., Schaumburg, Ill.

[21] Appl. No.: 69,045

[22] Filed: May 28, 1993

Related U.S. Application Data

[63] Continuation-in-part of Ser. No. 23,536, Feb. 26, 1993.

[51] Int. Cl.[6] .................................. H04B 1/00

[52] U.S. Cl. .................. 455/51.2; 455/54.1; 455/67.1; 375/356

[58] Field of Search .................. 455/51.2, 51.1, 455/54.1, 54.2, 33.1, 54.2, 67.1, 69; 375/107, 109, 110, 356, 358, 359

[56] References Cited

U.S. PATENT DOCUMENTS

| | | | |
|---|---|---|---|
| 4,850,032 | 7/1989 | Freesburg | 455/51.2 |
| 5,220,676 | 6/1993 | LoGalbo et al. | 455/51.2 |
| 5,280,629 | 1/1994 | LoGalbo | 455/51.2 |

*Primary Examiner*—Reinhard J. Eisenzopf
*Assistant Examiner*—Doris To
*Attorney, Agent, or Firm*—Timothy W. Markison

[57] ABSTRACT

Processing of message transmissions from any node in a simulcast multi-site communication system (100) begins when an initiating communication unit requests (400) to transmit a message to one or more network transceivers. After the request has been assigned by a call processing controller, the initiating unit transports (401) a time stamp message to each transceiver via a digital communication network (202). Each transceiver, after receiving the time stamp message, calculates (402) an outbound delay time and transports the outbound delay time to the initiating unit via the digital communication network. From the outbound delay time, the initiating unit calculates (406) a launch time, wherein the launch time accommodates the worst case expected transport delay through the digital communication network. The message to be transmitted and the launch time is transported to each of the transceivers, such that each transceiver simultaneously transmits the message at the launch time.

5 Claims, 4 Drawing Sheets

METHOD FOR INITIATING AND DETERMINING SIMULCAST TRANSMISSION OF A MESSAGE

This is a continuation-in-part of co-pending patent application entitled "Simulcast Group Determination of Best Signal", filed on Feb. 26, 1993, and having a Ser. No. of 08/023,536.

FIELD OF THE INVENTION

This invention relates generally to communication systems and, in particular, to simulcast communication systems.

BACKGROUND OF THE INVENTION

The basic operation and structure of land mobile radio communication systems are known. Such radio communication systems typically comprise a plurality of communication units (vehicle mounted or portable radios in a land mobile system and radio/telephones in a cellular system), a predetermined number of transceivers, which are located throughout a geographic region and transceive information via communication channels, and a controlling entity. The controlling entity may either be a centralized call processing controller or it may be a network of distributed controllers working together to establish communication paths for the communication units. The communication channels may be time division multiplex (TDM) slots, carrier frequencies, pairs of carrier frequencies or other radio frequency (RF) transmission mediums. A frequency or time portion of one or more of the communication channels may be established for call control purposes such that a communication unit may communicate with the system controller to request and receive system resources.

Multiple site communication systems which comprise a plurality of repeaters and transceivers that are distributed throughout a large geographic region are also known. Many multi-site systems use same-frequency simulcast, i.e. the same communication channel (or carrier frequency) is used by multiple sites throughout the region to simultaneously relay communications to communication units that are located throughout the multi-site system.

A typical transceiver in a simulcast multi-site communication system comprises an individual circuit that couples the repeater to a central radio system audio collection and signal distribution point (prime site). (Note that any site in the multi-site system may contain a transceiver, i.e. transmitter and receiver, or only a receiver.) Signals, such as control channel or traffic signaling data from the call processing controller, are distributed from the prime site on links to the transceiver sites for simultaneous transmission. Other signals such as, user data from a host computer, or voice dispatch speech from a console must also be distributed from the prime site. To accurately transmit these signals, dedicated, stable, and time-invariant links are used. A dedicated, that is, non-switched, link is used to carry the information to be transmitted from the prime site to each remote site, thus forming a "star" topology network, where the prime site is the center of the star. For example, the links may be analog and/or digital microwave channels. (Note that digital switching networks, for example those provided by public switched telephone network (PSTN) operators, are not used as links because they are not time-invariant.)

With the dedicated, stable, and time invariant links, the site transmitters can broadcast signals in phase, in time, and on the same frequency such that received signal distortion in overlapping site coverage areas is minimal. The stability of the links ensure that the resulting simulcasted signals remain within acceptable tolerances.

To account for the difference in the physical link transport time delays between the prime site and remote site transmitters, additional adjustable delay circuits are typically added to the links. The adjustable delay circuits compensate for the differences in physical link delay such that the total delay is the same at each transceiver site. This ensures that the signal for transmission arrives at each transceiver site at the exact same time. The adjustable time delay devices added to the transmission distribution links may be at the prime or remote sites.

To accommodate for fluctuations in physical link delays, circuits have been devised to manually or automatically adjust the adjustable time delay circuits. Typically, the channel must be excluded from service while a closed loop test is performed to measure and adjust the delay.

Many users of a simulcast system need immediate and constant access to their system channels. For these users, disabling a channel to conduct a closed loop test is inconvenient at best and potentially catastrophic. Such is certainly the case for Public Safety users and centralized controller systems. In a centralized controller system, if the centralized controller is cut off from the system due to a channel being down, communication units cannot communicate. To avoid this, some systems include duplicate prime site equipment, which involves added logic and switching functions that slows the switch-over process.

Other techniques are known which allow the use of time-variant delay links, such as those provided by public digital switching networks. Often these types of links are provided with lower tariffs than those that are time-invariant, making them more attractive for use in simulcast communication systems. However, links are often re-routed in these networks due to traffic overload or when failures occur. The new route may take a completely different path through different links and switches, even through Earth orbit satellites, and thus have a significantly different delay which distorts the simulcast transmission.

Therefore, a need exists for a multi-site simulcast communication system that can efficiently utilize time-invariant or time-variant distribution links, and automatically choose transmitter launch times without the requirement of a dedicated prime site, for signals sourced from any site in the system on a per call basis.

DESCRIPTION OF A PREFERRED EMBODIMENT

Figure 1:
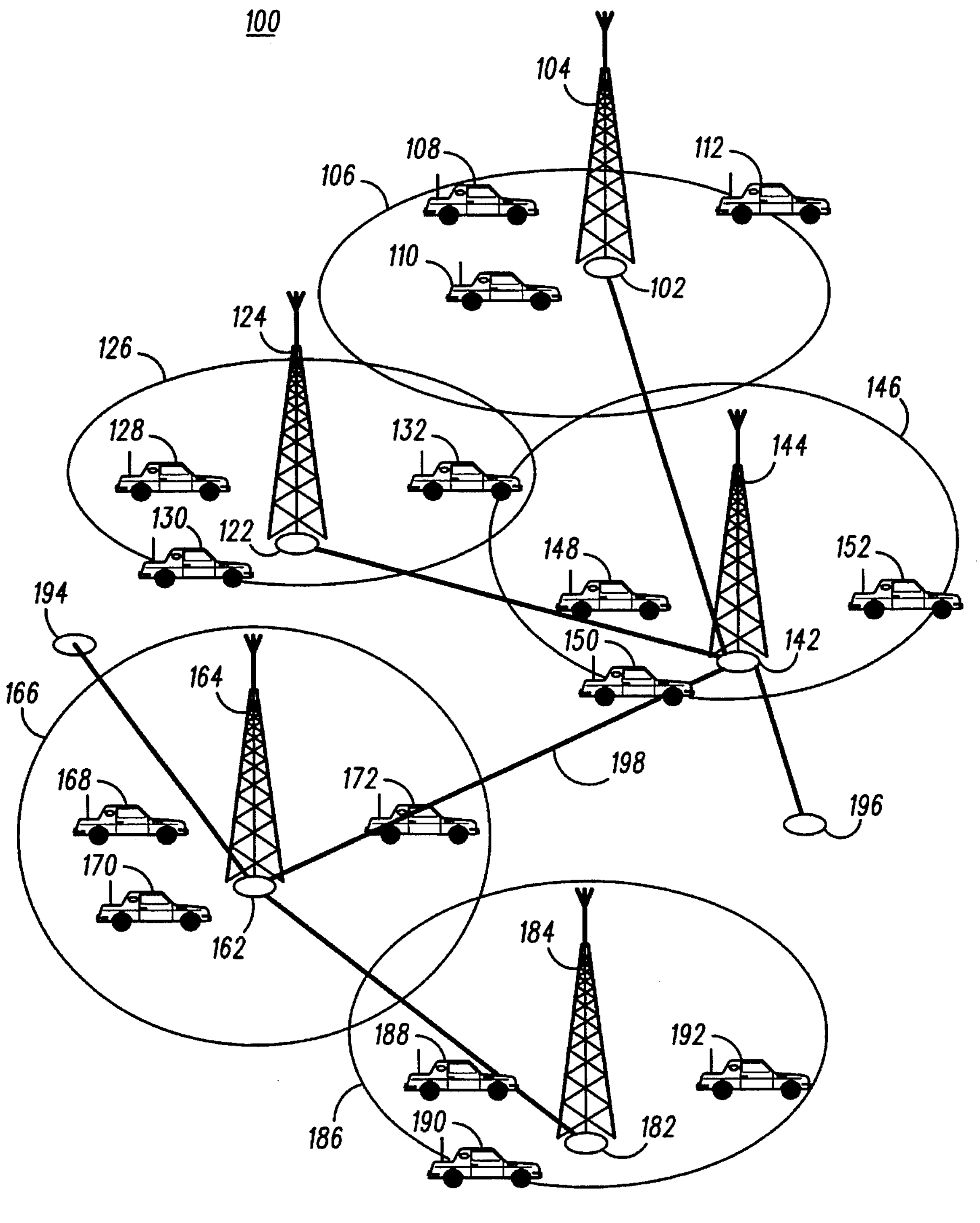
FIG. 1 illustrates a multi-site communication system that provides radio communication between communication units in accordance with the present invention.

FIG. 1 illustrates a multi-site simulcast communication system 100 that comprises network nodes, or sites, 102, 122, 142, 162, 182, 194, and 196 (7 shown) , communication units 108, 110, 112, 128, 130, 132, 148, 150, 152, 168, 170, 172, 188, 190, and 192 (15 shown), repeaters 104, 124, 144, 164, and 184 (5 shown), and sites having respective coverage areas 106, 126, 146, 166, and 186 (5 shown). FIG. 1 depicts overlapping coverage areas of sites such that there is a seamless operating area. The sites are linked together in a non-star digital communication network 198, such that every site is connected to every other site, although not necessarily by a direct path. The typical star configuration of prior art simulcast systems is unnecessary, although the present invention could be incorporated in a star configuration system. Further, some of the sites (102, 122, 142, 162, and 182) include repeaters to provide radio coverage areas, while other sites (194 and 196) do not. The sites without repeaters may be interconnected to consoles at dispatch centers which are not co-located at repeater sites, or they may simply be composed of a single call processing controller. (Note that a repeater may include a transceiver, i.e. a receiver and transmitter, or just a receiver.)

Figure 2:
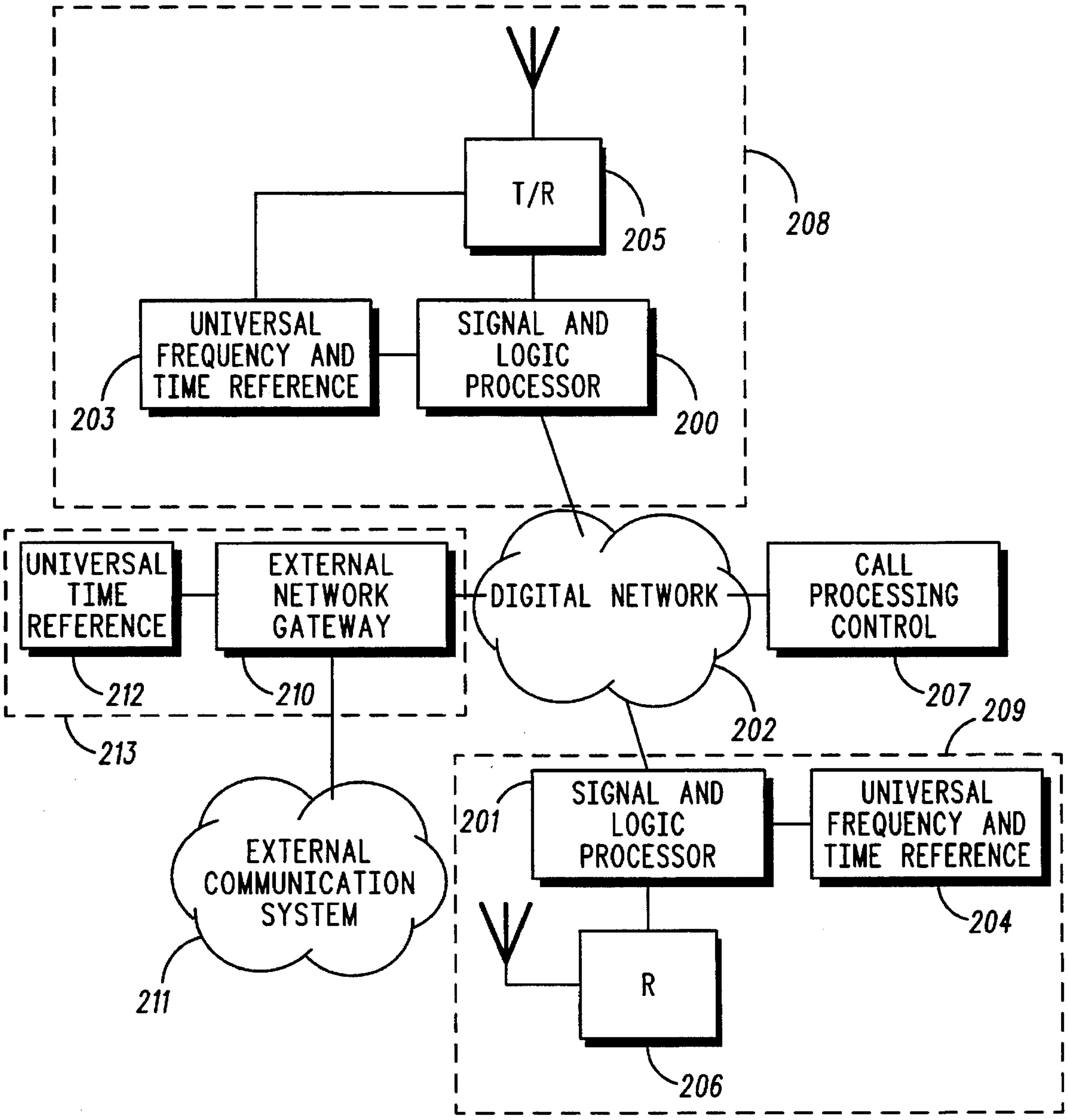
FIG. 2 illustrates a multi-site communication system that may incorporate the present invention.

FIG. 2 illustrates the same simulcast communication system as FIG. 1 but with a focus on site equipment coupled to the the digital communication network. A first simulcast site 208, comprises at least one signal and logic processor 200, at least one base station transceiver 205, and at least one universal frequency and time reference 203. The signal and logic processor 200 may comprise an IntelliRepeater Station Control Board as manufactured by Motorola Inc. A second site 209 also comprises a signal and logic processor 201, a universal frequency and time reference 204 and a base station 206 that, for illustration of possible site configuration purposes, contains only a receiver. The first and second sites 208 and 209 are operably connected to all other sites via the digital communication network 202. The digital communication network 202 carries both communication message payloads and control messages to establish communication. The digital communication network 202 may comprise time-variant delay links, such as those provided by public switching networks such as the public telephone switching network (PTSN). Often these type of links are provided with lower tariffs than those that are time-invariant, making them more attractive for use in simulcast communication systems. However, the links are often re-routed in these networks due to traffic overload or failures. The new route may take a completely different path through different links and switches, even through Earth orbit satellites, and thus have a significantly different delay.

At least one network interface point 213 is operably connected to the digital communication network 202 to allow message transfer between the external communication system 211 and the digital communication network 202. The external communication system 211 may be a local area network, host computer, computer aided dispatch system, or another radio communication system. The network interface point 213 comprises of at least one external network gateway 210 and at least one universal time reference 212 (discussed below with reference to FIG. 3).

At least one call processing controller 207 is operably connected to the digital communication network 202 to direct call establishment activity. The call processing controller may comprise a central or zone controller as is known, or a communication resource allocator which is also known. Note that each radio network or sub-network must at least include one call processing controller at any network node to establish communication between two or more communication units and network users. Further note that there may be multiple call processing controllers at different nodes in the network such that each call processing controller takes responsibility for different sub-networks of the network, where a sub-network is any subset of the total network nodes. Still further note that there is no requirement that a call processing controller be responsible for the site at which it is located. For example, a network consisting of many nodes which are considered to encompass several sub-networks, may have all call processing controllers located at the same node.

Figure 3:
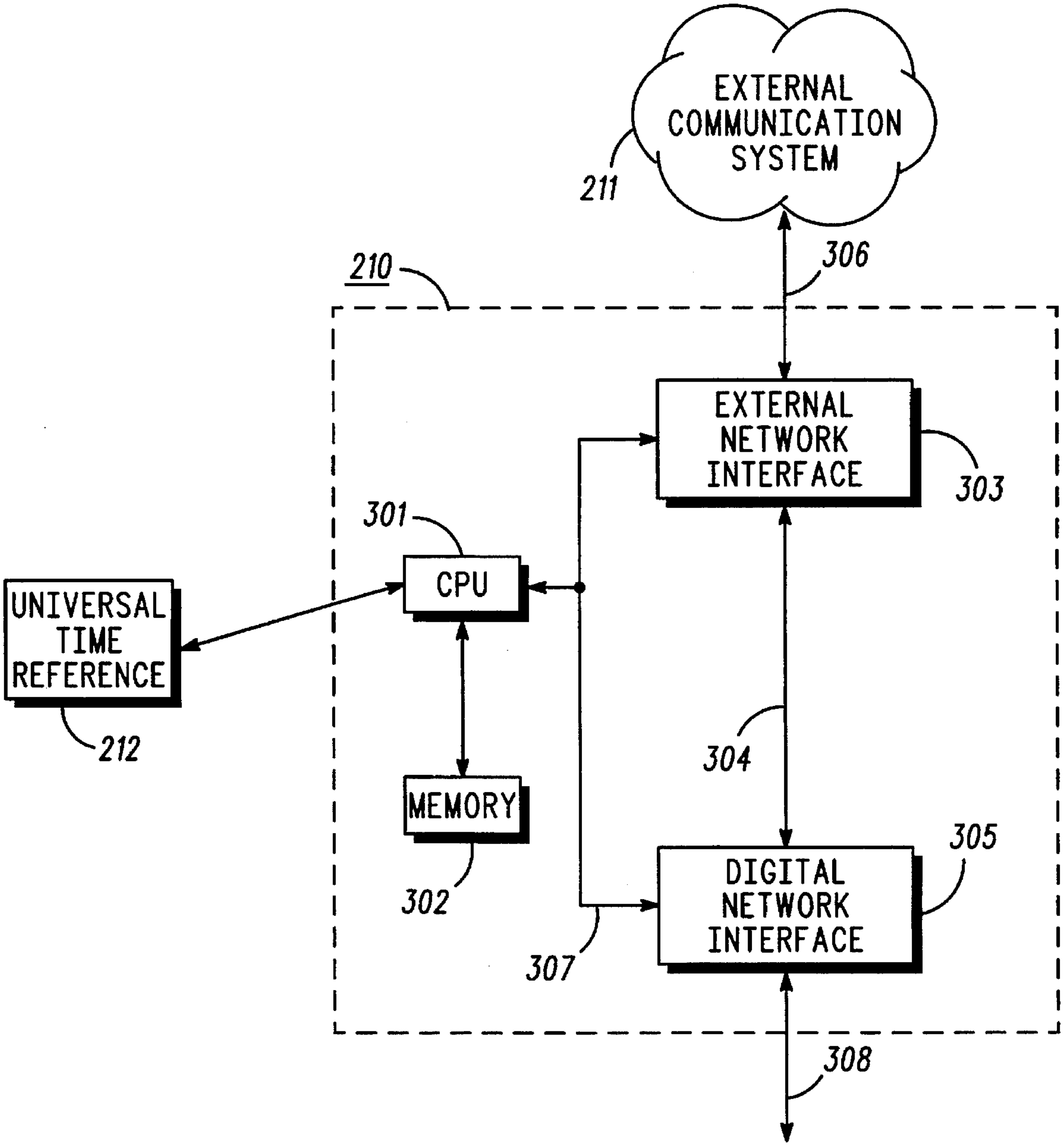
FIG. 3 illustrates the components associated with an external network gateway to process logic functions and signals in accordance with the present invention.

FIG. 3 illustrates the network interface point 213 which contains a universal time reference 212 and the associated functionality of the external network gateway 210 for interfacing to the external communication system 211 and digital communication network 202. The external communication system 211 receives and transmits signals to and from target communication units. The external network gateway 210, comprising a CPU 301, memory 302 for the CPU operations, external network interface 303 to operably connect the external communication system to the external network gateway, a digital communication network interface 305 connected to both an external digital link 308 and an internal digital bus 307 to operably connect the external communication system to the other sites in the simulcast network, and a universal time reference 212 such as a Global Positioning Satellite (GPS) receiver to provide a time standard for transmit launch time processing. The CPU 301 may comprise a Motorola MC68302. Each of these elements are readily known in the art, thus no further discussion will be presented except to facilitate the understanding of the present invention.

Figure 4:
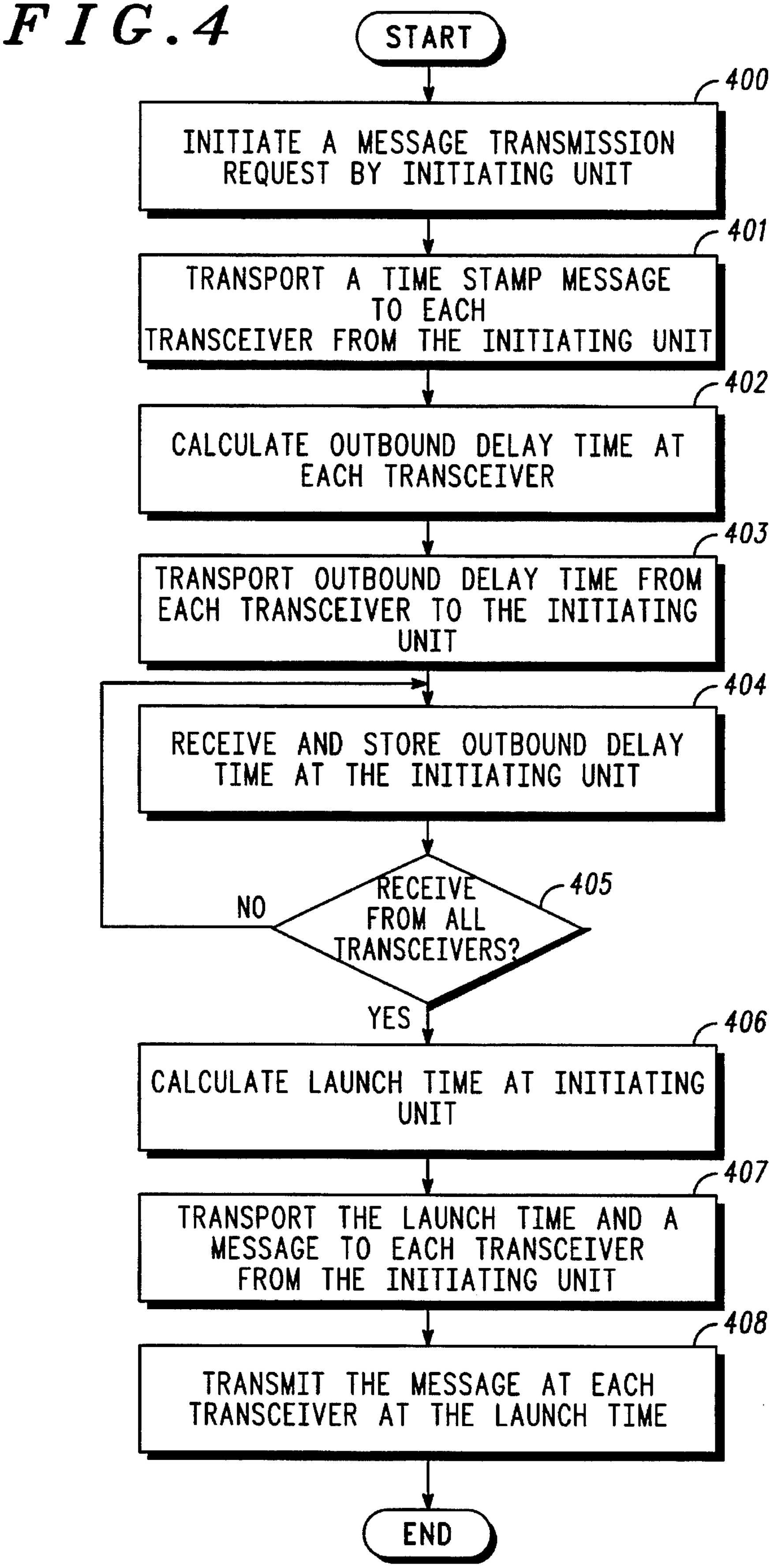
FIG. 4 illustrates a flow diagram for outbound link delay determination processing for transmitting simulcast signals in accordance with the present invention.

FIG. 4 illustrates a flow diagram for outbound link delay determination processing and transmitting simulcast signal in accordance with the present invention. Outbound link delay determination for all links to remote transmitters involved in a call is carried out by the initiating unit for that call. A subsequent call, from different initiating unit, will follow the same steps to determine the outbound delay from the perspective of the different initiating unit. A subsequent call will include a subsequent responsive message transmission, which may simply be an answer or comment in regards to the preceding call. To establish the subsequent call, the subsequent call will include a subsequent responsive message transmission request and a corresponding subsequent responsive call assignment in response to the subsequent responsive message transmission request. The same transceivers are generally involved in the subsequent call, however, the initiating unit is generally a different initiating unit as it is now the ultimate source of the subsequent message. The initiating unit, may be from the external communication system via the external network gateway, the call processing controller, or any one of the transceiver or receiver sites. At step 400, the initiating unit initiates a message transmission request to the call processing controller. Message transmissions could be user data, voice dispatch speech, or control channel and signaling data from the call processing controller.

The message transmission initiation further includes assigning, by the call processing controller, the transceiver resources and sending a call assignment message back to the initiating unit. The initiating unit then produces a time stamp message to be transported via the digital communication network to each transceiver assigned to the call. (Assigning transceivers is known, thus no further discussion will be presented.) The time stamp message contains a time stamp denoting the time the message enters the digital communication network. The time stamp could be determined by adding a short fixed offset which compensates for the time needed to produce the time stamp message and for it to enter the network to the absolute time provided by the universal time reference. The initiating unit transports the time stamp message to each transceiver assigned to the call via the digital communication network 401. If the initiating unit happens to also be one of the transceivers assigned to the call, then the time stamp message is transported from the initiating unit to itself by setting the sending address of the message equal to the destination address.

The remote site transceivers receive the time stamp message and uses the time stamp to calculate an outbound delay time which is the amount of time it took the message to traverse the digital communication network (from the initiating unit to the remote transceiver) 402. The outbound delay could be calculated, for example, by subtracting the time stamp value carried in the message from the present absolute time provided by the local time reference in the transceiver, minus a fixed compensation offset for message decode time. The resulting time is the outbound link delay to that transceiver. This calculated outbound delay time is then placed in a message by the remote site transceivers and transported back to the initiating unit on the digital communication network 403.

The initiating unit receives and stores the message containing the calculated outbound delay times from each of the RF transceiver sites 404, until all transceivers have responded 405. The outbound delay time is then used by the initiating unit to calculate a launch time 406. The launch time is determined by adding the maximum outbound delay time plus a fixed amount of time to account for processing delays at the transceivers to the absolute time that the signal message to be broadcast will enter the digital communication network. This ensures that all transceivers will have the signal to be transmitted in their transmit buffer before the launch time arrives.

The message to be transmitted, along with the transmit launch time, are prepared and then transported by the initiating unit to the transceiver sites assigned to the call 407. Typically, the transport is carried out to each of the transceiver equipped sites involved in this communication where the same assigned frequency is re-used. The messages that have been given a launch time by the initiating unit are then received via the digital communication network by every site involved in the call that is transceiver equipped. The launch time is the instant in time when all the universally coordinated transceivers will transmit the same modulation sequence in phase. The message received from the digital communication network may then be buffered in a transmit time delay queue memory until the launch time. When the launch time arrives, as indicated by the universal frequency and time reference, the transceivers transmit the message on the same frequency and in phase with the other involved simulcast transceiver sites 408.

From the above, the present invention allows an initiating source communication unit, whether it is from the external communication system via the network interface point, call processing controller, or any one of the transceiver sites in the simulcast radio network to transmit information on a same simulcast frequency carrier. The simulcast transmission is essentially in-phase and on-frequency so as to maximally utilize the efficiency of a single channel for a single source to multi-site communication.

Time varying delay links are accommodated with this invention, including those with a broad range of possible delays, through measuring outbound delays continually. Universally coordinated launch times are tuned to the current network configuration, rather than simply determined by a predetermined worst case constant. By not using a prior art star site configuration, the radio network is not susceptible to single site (prime site) failures thus providing a constant grade of service to the users, without the need for switching systems, without the need for duplicate systems, without the need for time invariant distribution links, and without any foreknowledge of time varying link delays.

We claim:

1. In a simulcast communication system that includes a plurality of sites, a time reference, at least two transceivers, a plurality of communication units, a call processing controller, and an external network gateway, wherein each site of the plurality of sites includes at least one receiver or a transceiver of the at least two transceivers, wherein the plurality of sites are operably linked together, to the call processing controller, and to the external network gateway by a non-star topology digital communication network, and wherein the external network gateway operably couples the simulcast communication system to an external communication system, a method for simulcast transmission of a message and simulcast transmission of a subsequent responsive message, the method comprises the steps of;

a) initiating a message transmission request by a first initiating unit, wherein the first initiating unit is one of a set of the external network gateway, the call processing controller, a transceiver of the at least two transceivers, and a receiver of the at least one receiver in each site;

b) at the first initiating unit, upon receiving a call assignment, transporting a first time stamp message to each of the at least two transceivers via the non-star topology digital communication network;

c) upon receiving the first time stamp message, calculating, by the at least two transceivers, a first outbound delay time, wherein the first outbound delay time is based on the first time stamp message and time when the first time stamp message was received;

d) transporting, by each of the at least two transceivers, the first outbound delay time to the first initiating unit;

e) upon receiving the first outbound delay time from each of the at least two transceivers, calculating, by the first initiating unit, a first launch time based on the first outbound delay time from each of the at least two transceivers;

f) transporting, by the first initiating unit, the first launch time and the message to the at least two transceivers, via the non-star topology digital communication network, wherein the at least two transceivers transmit the message at the first launch time;

g) upon completion of transporting the message, by the first initiating unit, initiating a subsequent responsive message transmission request by a second initiating unit, wherein the second initiating unit is one of a set of the external network gateway, the call processing controller a transceiver of the at least two transceivers, a receiver of the at least one receiver in each site, and wherein the second initiating unit is different than the first initiating unit;

h) at the second initiating unit, upon receiving a subsequent responsive call assignment, transporting a second time stamp message to each of the at least two transceivers via the non-star topology digital communication network;

i) upon receiving the second time stamp message, calculating, by the at least two transceivers, a second outbound delay time, wherein the second outbound delay time is based on the second time stamp message and time when the second time stamp message was received;

j) transporting, by each of the at least two transceivers, the second outbound delay time to the second initiating unit;

k) upon receiving the second outbound delay time from each of the at least two transceivers, calculating, by the second initiating unit, a second launch time based on the second outbound delay time from each of the at least two transceivers; and l) transporting, by the second initiating unit, the second launch time and the subsequent responsive message to the at least two transceivers, via the non-star topology digital communication network, wherein the at least two transceivers transmit the subseouent responsive message at the second launch time,

2. The method of claim 1, wherein the calculation of the first outbound delay time of step (c) further comprises calculating the first outbound delay time to be substantially equal to difference between the first time stamp message and the time when the first time stamp message was received, and wherein the calculation of the second outbound delay time of step (i) further comprises calculating the second outbound delay time to be substantially equal to difference between the second time stamp message and the time when the second time stamp message was received.

3. The method of claim 1, wherein the calculation of the first launch time of step (e) further comprises calculating the first launch time to be substantially equal to the first outbound delay time of a transceiver of the at least two transceivers having a greatest first outbound delay time, and wherein the calculation of the second launch time of step (k) further comprises calculating the second launch time to be substantially equal to the second outbound delay time of a transceiver of the at least two transceivers having a greatest second outbound delay time.

4. In a simulcast communication system that includes a plurality of sites, a time reference, at least two transceivers, a plurality of communication units, a call processing controller, and an external network gateway, wherein each site of the plurality of sites includes at least one receiver or a transceiver of the at least two transceivers, wherein the plurality of sites are operably linked together, to the call processing controller, and to the external network gateway by a non-star topology digital communication network, and wherein the external network gateway operably couples the simulcast communication system to an external communication system, a method for a first initiating unit to initiate a simulcast transmission of a message, followed by a second initiating unit initiating a simulcast transmission of a subsequent responsive message, the method comprises the steps of:

a) initiating a message transmission request by the first initiating unit, wherein the first initiating unit is one of a set of the external network gateway, the call processing controller, a transceiver of the at least two transceivers, and a receiver of the at least one receiver in each site;

b) at the first initiating unit, upon receiving a call assignment, transporting a first time stamp message to each of the at least two transceivers via the non-star topology digital communication network;

c) receiving, by the first initiating unit, a first outbound delay time from each of the at least two transceivers;

d) calculating, by the first initiating unit, a first launch time based on the first outbound delay time from each of the at least two transceivers;

e) transporting, by the first initiating unit, the first launch time and the message to the at least two transceivers, via the non-star topology digital communication network, wherein the at least two transceivers transmit the message at the first launch time;

f) upon completion of transporting the message, by the first initiating unit, initiating a subsequent responsive message transmission request by a second initiating unit, wherein the second initiating unit is one of a set of the external network gateway, the call processing controller, a transceiver of the at least two transceivers, a receiver of the at least one receiver in each site, and wherein the second initiating unit is different than the first initiating unit;

g) at the second initiating unit, upon receiving a subsequent responsive call assignment, transporting a second time stamp message to each of the at least two transceivers via the non-star topology digital communication network;

h) receiving, by the second initiating unit, a second outbound delay time from each of the at least two transceivers;

i) calculating, by the second initiating unit, a second launch time based on the second outbound delay time from each of the at least two transceivers; and j) transporting, by the second initiating unit, the second launch time and the subsequent responsive message to the at least two transceivers, via the non-star topology digital communication network, wherein the at least two transceivers transmit the subsequent responsive message at the second launch time.

5. The method of claim 4, wherein the calculation of the first launch time of step (d) further comprises calculating the first launch time to be substantially equal to the first outbound delay time of a transceiver of the at least two transceivers having a greatest first outbound delay time, and wherein the calculation of the second launch time of step (j) further comprises calculating the second launch time to be substantially equal to the second outbound delay time of a transceiver of the at least two transceivers having a greatest second outbound delay time.

* * * * *